United States Patent
Fukumoto et al.

[11] Patent Number: 6,121,959
[45] Date of Patent: *Sep. 19, 2000

[54] DISPLAY CONTROL DEVICE

[75] Inventors: Masaharu Fukumoto; Hiroyuki Segawa, both of Kanagawa; Takayuki Shiomi; Osamu Oda, both of Tokyo; Kenichi Konuma, Chiba; Etsuko Morota, Saitama; Miwako Yoritate, Tokyo; Tsuyoshi Hirano, Tokyo; Kayo Kono, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/856,128

[22] Filed: May 14, 1997

[30]        Foreign Application Priority Data

May 14, 1996  [JP]  Japan ................................. 8-142374
Apr. 7, 1997  [JP]  Japan ................................. 9-088113

[51] Int. Cl.⁷ .................................................. G09G 5/00
[52] U.S. Cl. ......................... 345/173; 345/123; 345/174; 348/734; 178/18.05
[58] Field of Search ........................... 345/10, 123, 145, 345/115, 173, 168, 54.1; 348/569, 734, 564, 563, 558, 554

[56]                References Cited

U.S. PATENT DOCUMENTS

| | | | |
|---|---|---|---|
| 4,566,001 | 1/1986 | Moore et al. | 340/711 |
| 5,053,758 | 10/1991 | Cornett et al. | 345/174 |
| 5,347,295 | 9/1994 | Agulnick et al. | 345/156 |
| 5,526,023 | 6/1996 | Sugimoto et al. | 345/173 |

FOREIGN PATENT DOCUMENTS

| | | | |
|---|---|---|---|
| 0249293 | 6/1987 | European Pat. Off. | G06F 3/02 |
| 0597753 | 10/1993 | European Pat. Off. | G09F 9/00 |
| 06095796 | 9/1992 | Japan | G06F 3/03 |
| 9603698 | 7/1994 | WIPO | G06F 15/02 |

*Primary Examiner*—Dennis-Doon Chow
*Assistant Examiner*—Amr Awad
*Attorney, Agent, or Firm*—Jay H. Maioli

[57]                     ABSTRACT

A monitor device capable of setting and adjusting various function items with an operation system having fewer number of keys and fitting an operation sense of a user. The movement of the cursor, and the change of the sound volume display and all kinds of adjustment values in a submenu can be performed with a tablet key which can be pressed and slide-operated with the result that almost all of the setting and adjustment on all kinds of functions of the monitor device can be performed with fewer required than keys of the conventional operation system.

8 Claims, 13 Drawing Sheets

DISPLAY CONTROL DEVICE

BACKGROUND OF THE INVENTION

1. Field of the Invention

This invention relates to a display control device, and more particularly, to a display control device for a monitor that can control a display in accordance with key operations.

2. Description of the Related Art

Display devices such as monitor devices and television sets have an increasing diversity of functions, and the number of settings on the display device which can be arbitrarily changed by a user increases proportionally.

However, as the number of settings on the display device which can be changed by the user increases as described above, the setting operations naturally become more complicated and troublesome. As a result, it is desirable that a large number of settings can be easily changed and adjusted with an operation system which the user can understand as easily as possible.

Therefore, for example, keys respectively corresponding to functions have been added to a monitor device and are provided on an operation part of the main body of the monitor device or a remote controller. However, in this case, the number of keys to be provided becomes very large, with the result that such an operation system becomes very difficult for the user to operate.

Consequently, it is preferable for the operation system to be made easier to handle by users by decreasing the number of keys. Therefore, in the prior art, for example, a sound volume key, and an input switching key for switching input sources which are relatively frequently used are independently provided on the main body of the monitor device and the remote controller. Besides, adjustment items such as picture quality adjustment and sound quality adjustment which are not frequently used are selected from items on a menu screen to be adjusted.

However, in the aforementioned operation system, keys for functions which are frequently used are independently provided. In addition, the operation system is constituted so that changes of some adjustment values including sound volume and movement of a cursor on the menu screen are normally performed by using a pair of scroll-up and scroll-down keys (or right and left keys), so that the number of keys which can be eliminated is limited.

Furthermore, with respect to sensory-related operations such as the adjustment of the values and the movement of the cursor as described above, there is a problem in that the method for performing the aforementioned operations by pressing the scroll-up and scroll-down keys (or right and left keys) does not necessarily correspond to the operating sense of the user.

SUMMARY OF THE INVENTION

The objects of the invention have been achieved by the provision of a display control device which controls adjustment of a value of each set item to be displayed on a monitor and selection of the set item. The device has a pressing region and includes pressing means for outputting positional information according to a pressed position in the pressing region; a detecting means for detecting based on the positional information whether the pressed position pressed by the pressing means moves, and for generating movement information indicating the change amount of the positional information when the pressed position moves; and a control means, for controlling the adjustment of the value of each set item and selection of the set item on the basis of the movement information in the case of detecting by the detecting means that the pressed position moves or on the basis of the positional information in the case of detecting by the detecting means that the pressed position does not move.

In the aforementioned structure, operations for changing all kinds of adjustment values and changing a position of a cursor can be performed in accordance with information of a position where the user presses on a tablet (pressing means) and movement information which is obtained by performing a slide operation on the tablet with pressing.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention Will be described with reference to the accompanying drawings:

Note that a display control device according to an embodiment of the present invention is provided in a monitor device. The explanation of the display control device will be described in the following order.

1. External Appearance of the Monitor Device
2. Tablet Key
3. Structure of the Monitor Device 4. Structure of a Remote Controller
5. Example of Operation on the Monitor Device of the Embodiment
6. Processing Operation Based on Key Operations of the Embodiment
   (6-a. Sending Processing Operation of the Remote Controller)
   (6-b. Display Control Processing Operation of a System Controller in the Monitor Device)

1. External Appearance of the Monitor Device

Figure 1:
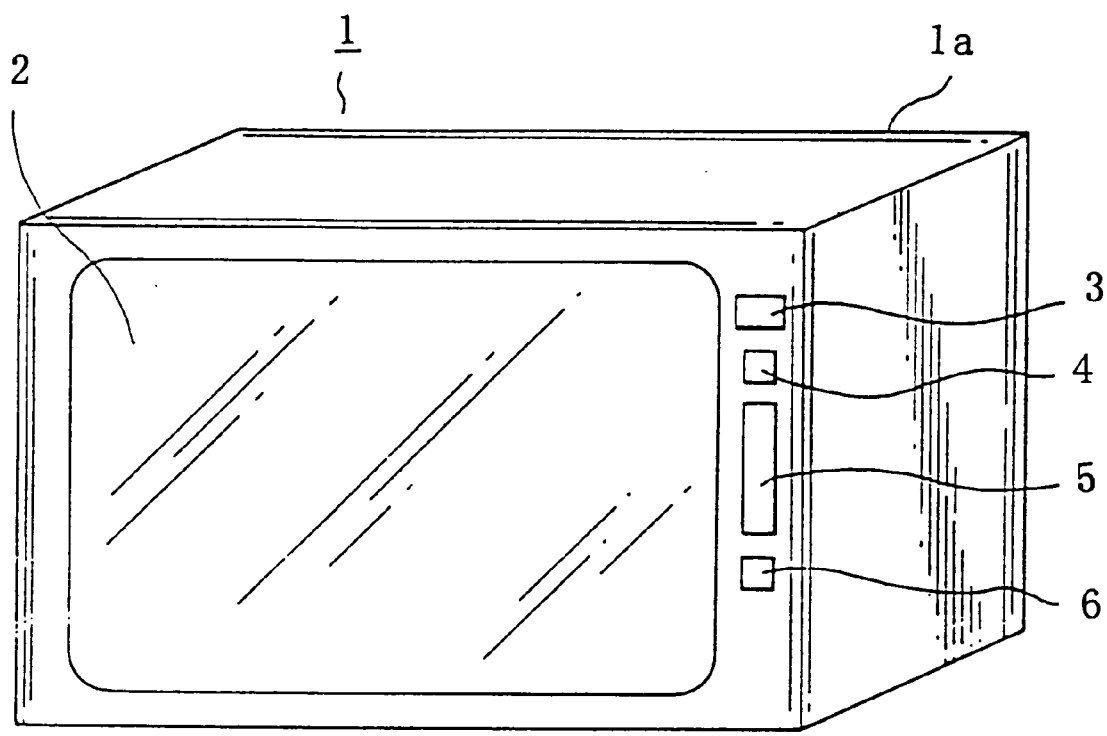
FIG. 1 is a perspective diagram showing an example of an external appearance of a monitor device according to an embodiment of the present invention.

FIG. 1 is a perspective diagram showing one example of an external appearance of the monitor device according to the embodiment of the present invention. In the monitor device 1 shown in FIG. 1, a cathode ray tube (CRT) 2 used as a display screen is provided on a front surface panel of a box body 1a. Further, in FIG. 1, the right edge side of the front surface panel constitutes an operation panel. A power supply key 3 for turning on/off power supply of the monitor device, a control key 4 for switching display/erasure of a menu screen described later, a tablet key 5 for performing cursor movement on the menu screen and up/down of adjustment values, and an enter key 6 for performing a decision operation for all kinds of set items are provided from top of the operation panel in this order.

2. Tablet key

Next, the tablet key 5 provided on the panel surface of the monitor device 1 will be explained.

In this embodiment, the tablet key 5 is merely pressed or the tablet key 5 is operated by sliding a user's finger in a vertical direction while pressing (hereinafter, referred to as a slide operation), thereby a cursor can moves on the menu screen and the adjustment value of the current selected item can change.

Figure 2A:
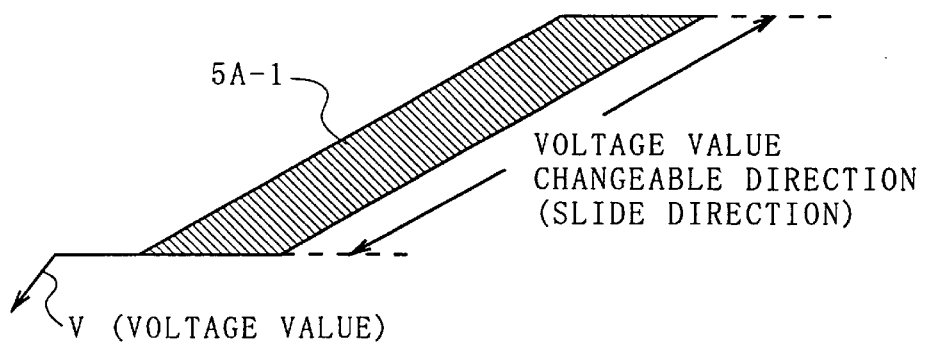
FIGS. 2A to 2C are perspective diagrams showing a structure of a tablet used in a tablet key according to the embodiment.

First, the structure of the tablet key 5 will be explained schematically. FIG. 2A shows a tablet sheet 5A-1 forming the tablet key 5. In the tablet sheet 5A-1, a voltage value V which changes corresponding to the position where the tablet key 5 is pressed on the sheet is obtained. In the case of the embodiment, in consideration of the actual form of usage, the voltage value corresponding to the pressed position on the sheet is set so as to change one-dimensionally only in the direction shown in the Figure.

Figure 2B:
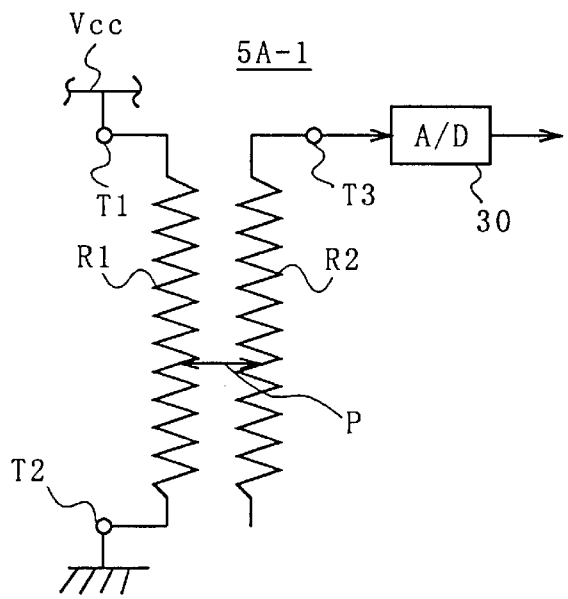

The tablet sheet 5A-1 according to the embodiment can use a tablet which is provided as an operating device for moving a cursor or the like in a computer device, that is, which is used for a track pad (grind point) or the like. A patent application covering a system used in a remote controller of the monitor device using the track pad has been applied for and is assigned to the assignee of the present application (Patent Application Ser. No. 731,165 filed on Oct. 10, 1996). FIG. 2B shows one embodiment of the structure of the tablet usable as the tablet sheet 5A-1 according to the embodiment.

In the tablet sheet 5A-1 shown in FIG. 2B, the carbon resisters R1 and R2 are disposed so as to be opposite each other. The resisters R1 and R2 contact each other at a pressed position P by pressing the tablet sheet 5A-1.

In this case, the electrodes T1 and T2 are drawn out from both edges of the resister R1. The electrode T1 is connected to a line of a direct current voltage Vcc having a predetermined level, and the electrode T2 is grounded. Further, an electrode T3 is drawn out from one edge of the resister R2 and the other edge is opened. The electrode T3 is input to, for example, an A/D converter 30.

In order to detect the voltage value V corresponding to the pressed position P from the tablet sheet 5A-1 having such a structure, at first, the voltages Vcc [V] and 0 [V] are respectively applied to the electrodes T1 and T2 of the resister R1 so as to generate a potential slope between the voltages Vcc [V] and 0 [V] in the resister R1.

In this state, when the resisters R1 and R2 are connected at the arbitrary pressed position P by pressing the tablet sheet 5A-1, the potential of the resister R1 at the pressed position P is conducted to the electrode T3 through the resister R2. The voltage being an analog value, which is obtained by the electrode T3, for example, is input to the A/D converter 30 to be converted into voltage information having digital values.

Figure 2C:
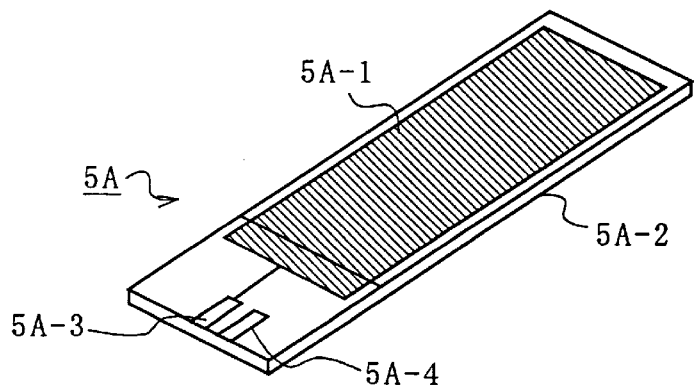

FIG. 2C is a perspective diagram showing a structure of a tablet 5A on which the tablet sheet 5A-1 is provided. As shown in FIG. 2C, the tablet sheet 5A-1 is arranged on a substrate 5A-2 and an electrode 5A-3 for outputting the voltage value corresponding to the operating position on the tablet sheet is drawn out. In addition, a ground electrode 5A-4 which is connected to a ground potential is provided.

Figure 3:
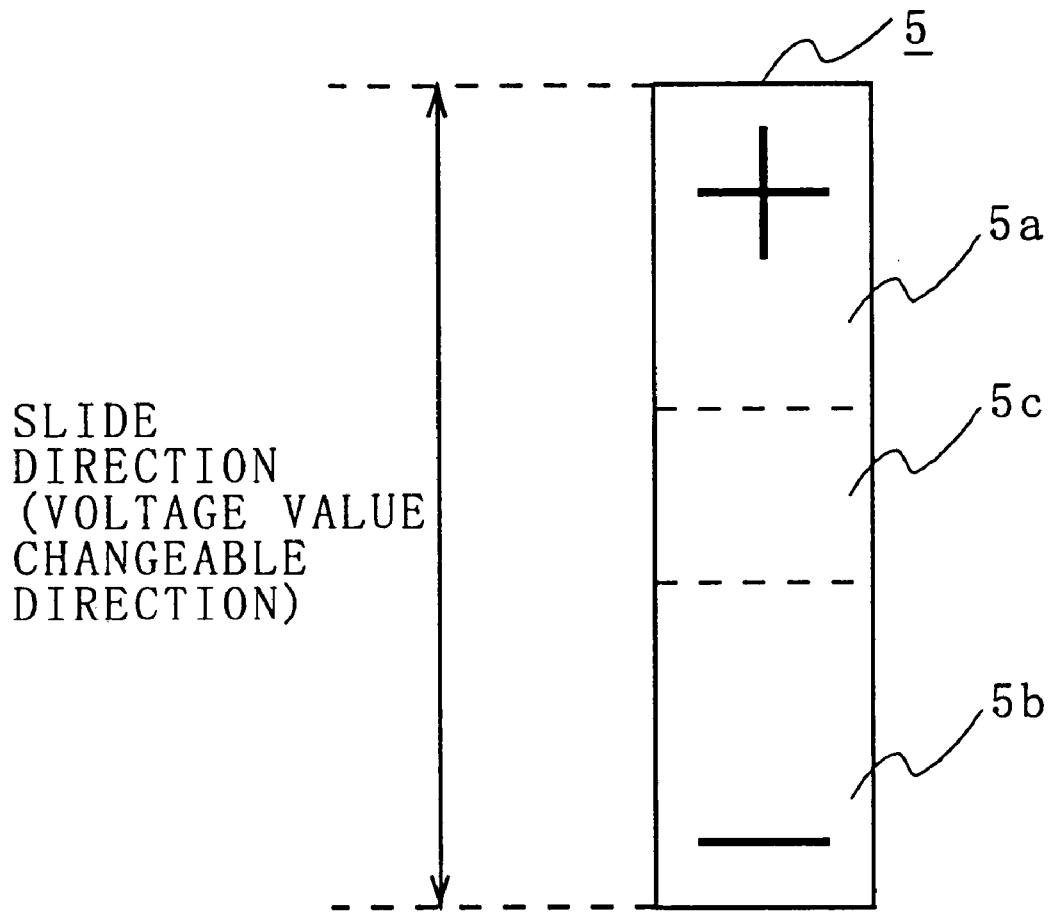
FIG. 3 is a front diagram showing the tablet key which is provided in the monitor device according to the embodiment.

FIG. 3 is a diagram showing a state where a tablet key 5 providing the tablet 5A having the aforementioned structure is provided on the monitor device 1 shown in FIG. 1. The tablet key 5 is constituted in such a manner that a panel sheet on which a [+] symbol and a [−] symbol are printed as shown in FIG. 3 is provided on the surface of the tablet 5A shown in FIG. 2C.

In the tablet key 5, a scroll-up region 5a corresponding to the part where the [+(plus)] symbol is printed, a scroll-down region 5b corresponding to the part where the [−(minus)] symbol is printed, and a non-sensitive zone region 5C which is provided between the scroll-up region 5a and the scroll-down region 5b are partitioned and set. The regions are set by a system controller 11 which will be described in FIG. 4, on the basis of information on the voltage value corresponding to the position where the user presses on the tablet key 5.

Note that, the set of the partition of the scroll-up region 5a, the scroll-down region 5b, and the non-sensitive zone region 5c is regarded as effective only in the case where the user presses a certain position on the tablet 5 without sliding along the tablet key 5 as an operation form of the tablet key 5. In the case where the user performs a slide operation while pressing in a direction shown by an arrow in FIG. 3 by using a finger (that is, in the case where the voltage value V corresponding to the pressed position on the tablet key 5 changes continuously), the set of the partition thereof is regarded as ineffective. The effective/ineffective setting of the non-sensitive zone region 5c, for example, is realized by recognizing the voltage value which is output from the tablet key 5.

In the tablet key 5 having such a structure, the vertical movement of the cursor and the adjustment of the adjustment value of the selected menu item can be performed by either of two operating methods as described later in FIG. 5.

That is, either of two operating methods can be performed: a first operation in which, the scroll-up region 5a and the scroll-down region 5b of the tablet key 5 shown in the FIG. 3 are treated as a scroll-up key and a scroll-down key respectively by individually pressing them, so that cursor movement or up/down of the adjustment value is performed; and a second operation in which, the tablet key 5 is slid, so that cursor movement or up/down of the adjustment value is performed in accordance with the slide-operated direction and the amount of movement. The user can arbitrarily select in accordance with his liking which method of operation is performed. The system controller 11 (described later in FIG. 4) of the monitor device 1 can control an operation corresponding to any operating method.

3. Structure of the Monitor Device

Figure 4:
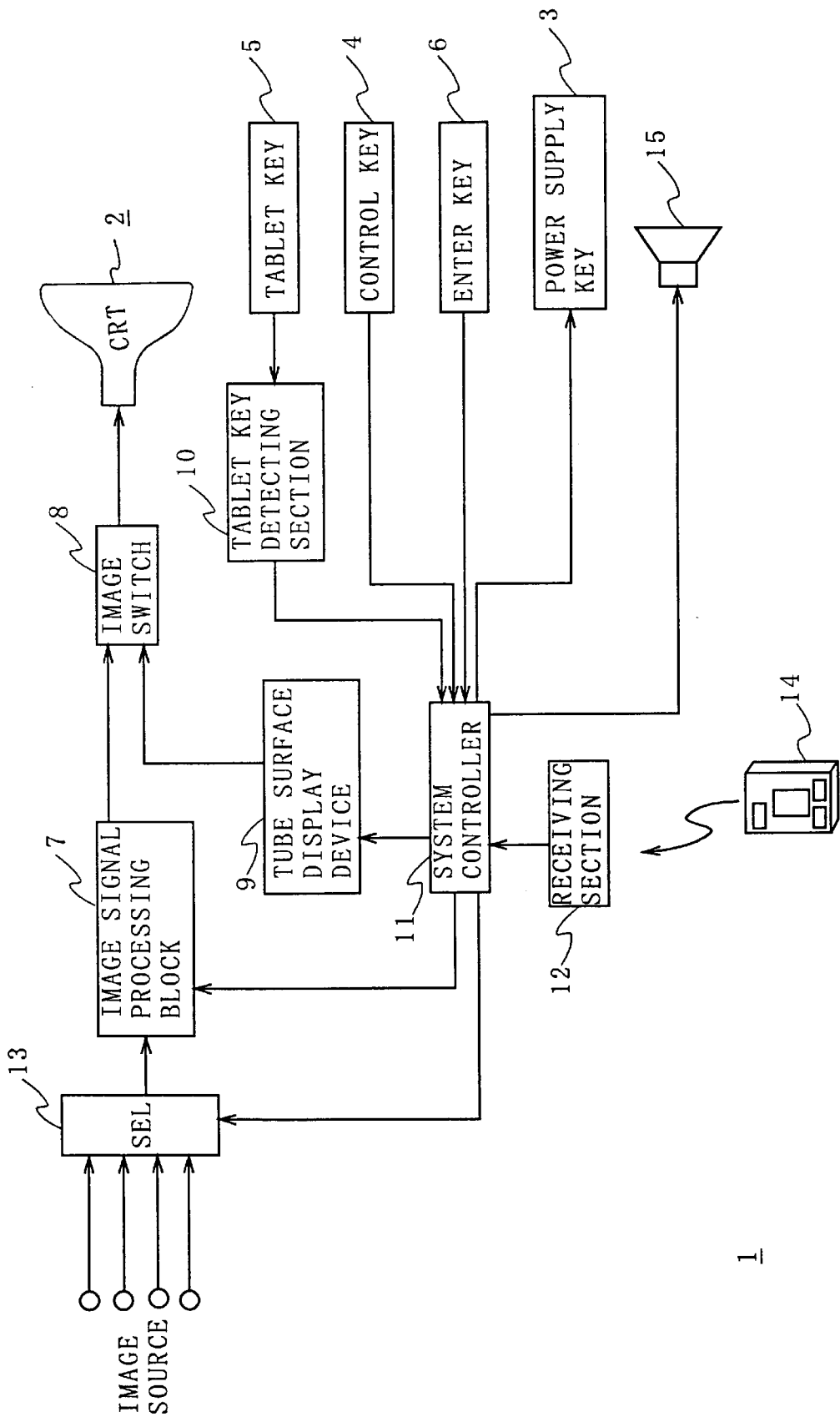
FIG. 4 is a block diagram showing a structure of the monitor device according to the embodiment.

FIG. 4 is a block diagram showing a structure of an essential part of the monitor device 1 according to the embodiment. Note that the same reference numerals are applied to parts corresponding to FIG. 1 and an explanation thereof is omitted.

In FIG. 4, for example, image signals of plural external image sources are supplied to an image signal switching section 13. In the image signal switching section 13, on the basis of a control signal output from the system controller 11, the input image signals are alternatively selected and supplied to an image signal processing block 7.

The image signal processing block 7 performs a required signal processing on the input image signal to supply it to an image switch 8. A signal processing operation in the image signal processing block 7 is controlled by the system controller 11.

A tube surface display device 9 is provide with a character generator and an on-screen display and performs a tube surface display such as a display of a sound volume adjustment and a display of a menu screen which will be described later. In the tube surface display device 9, an image signal for a required tube surface display is generated by control of the system controller 11 to be supplied to the image switch 8. Then, at a predetermined timing for displaying an image for the tube surface display on a predetermined position of the display screen, the image switch 8 performs signal switching.

Thereby, in a CRT 2, characters for the tube surface display or the like can be displayed to overlap with the image of the image source supplied from the image signal processing block 7.

The voltage value corresponding to the pressed position, which is outputted from the tablet key 5, is inputted to a tablet key detecting section 10. The tablet key detecting section 10 is equipped with, for example, a micro computer and a RAM for storing all kinds of required calculation information. For example, on the basis of voltage value information which is sampled from the tablet key 5 after each predetermined interval of time, absolute positional information which corresponds to the current pressed operation position P on the tablet key 5 is generated at least. In this case, for example, the tablet key detecting section 10 may be equipped with the A/D converter 30 shown in FIG. 2B and arranged so that the analog voltage value is input to tablet key detecting section 10 and a corresponding digital value is inputted to system controller 11.

Figure 6:
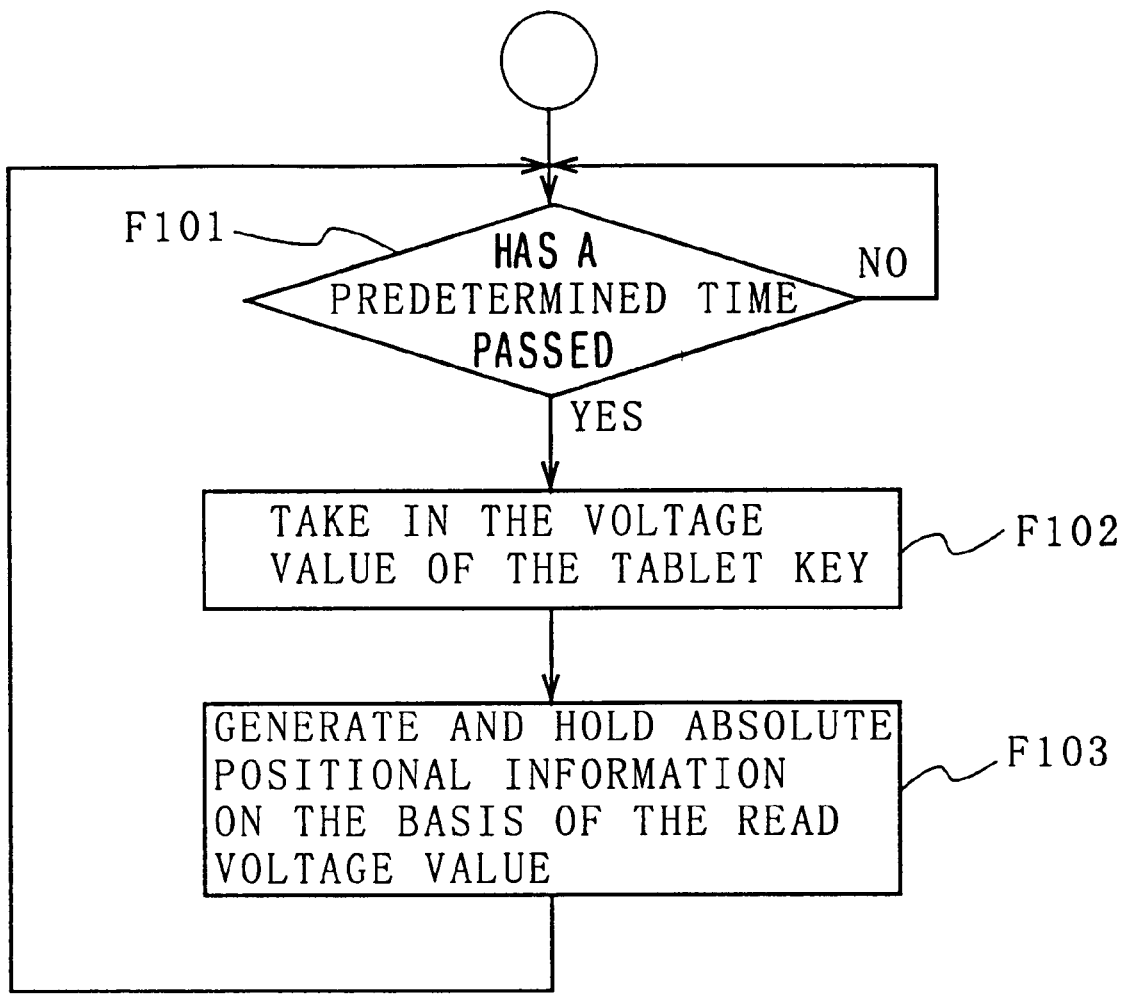
FIG. 6 is a flow chart showing a processing operation in a tablet detecting section.

Here, FIG. 6 shows a processing operation for detecting the absolute positional information of the tablet key detecting section 10 according to the embodiment. In the beginning, at step F101, the tablet key detecting section 10 judges whether a predetermined time set beforehand has passed. If the predetermined time has passed, the process proceeds to step F102 to perform a processing for reading the current voltage value outputted from the tablet key 5. Here, as the voltage value outputted from the tablet key 5, for example, the minimum value corresponding to the voltage 0 [V] or the maximum value corresponding to the voltage Vcc [V] is used when the pressing operation is not performed. When the pressing operation is performed, the voltage value corresponding to the pressed operation position P is used which is within a range of more than 0 [V] and less than Vcc [V].

When reading of the voltage value is completed at step F102, the absolute positional information is generated at step F103 based on the read voltage value and is stored in the RAM 12, and then the process returns to step F101. This absolute positional information is information indicating an absolute operational position on the tablet key 5.

In this way, the tablet key detecting section 10 reads and samples the current voltage value of the tablet key 5 as operational information of the tablet key 5 after each predetermined internal of time, for example, for each eight vertical scanning periods, i.e., 16 [mmsec]×8=128 [mmsec], and continues processing by holding the voltage value as the positional information.

Note that, on the basis of the voltage value previously taken in and the voltage value currently taken in the tablet key detecting section 10 according to this embodiment calculates and holds information of the relative change amount (information of relative movement amount) of the current voltage value with respect to the previous voltage value. The system controller 11 can also execute a required calculation processing and a control processing on the basis of the absolute movement amount information.

Operational information data generated at the tablet key detecting section 10 is taken in by the system controller 11 for each predetermined interval of time, for example, every 128 [mmsec].

In this case, operation signals of the control key 4, the enter key 6, and the power supply key 3 are directly inputted to the system controller 11.

A speaker 15 is provided for outputting an instruction sound such as a beep sound so that the user can confirm when some set items are decided by operation of the enter key 6. In this case, the sound signal of the beep sound is supplied to speaker 15 from the system controller 11.

A receiving section 12 receives an operational information signal which is sent based on the operation of the remote controller 14 in order to supply this operational information signal to the system controller 11. In the remote controller 14, for example, a group of keys are provided as an operation panel similar to that provided on the main body of the monitor device 1 shown in FIG. 1, and similar operations can be performed using remote controller. The structure of the remote controller 14 will be described later.

Note that, in FIG. 4, a diagram of the circuit structure of the sound signal system to processing the sound signal of the input source to output as a sound is omitted. However, in actuality, for example, an input terminal for the sound signal corresponding to the image source is provided, thereby the sound signal corresponding to the selected image source is selected. A required signal processing is performed on the selected sound signal by a sound signal processing block which is not shown, and then the signal is output as an amplified sound signal through an amplification circuit.

4. Structure of Remote Controller

Figure 5:
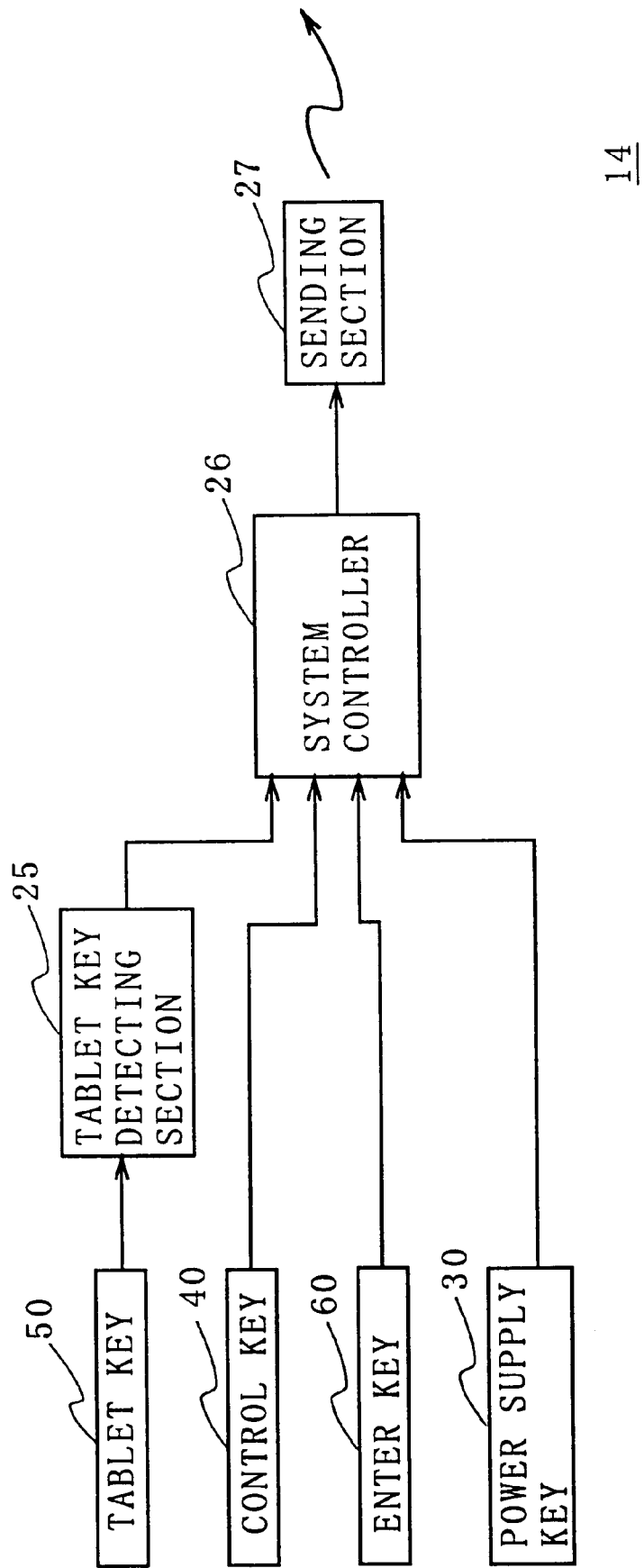
FIG. 5 is a block diagram showing a structure of a remote controller according to the embodiment.

FIG. 5 is a block diagram showing an example of the internal structure of the remote controller 14 according to the embodiment. The remote controller 14 is equipped with a tablet key 50, a control key 40, an enter key 60, and a power supply key 30 which respectively have similar functions to the tablet key 5, the control key 4, the enter key 6, and the power supply key 3 provided as the operation panel on the main body of the monitor device 1.

In this case, the tablet key 50 has similar structure and appearance structure to that of FIGS. 2A to 2C and 3. The voltage value as operational information of the tablet key 50 is taken in by a tablet key detecting section 25. The tablet key detecting section 25 has a similar structure to the tablet key detecting section 10 provided in the monitor device 1. And, for example, by a processing operation similar to the operation described in FIG. 6, the tablet key detecting section 25 reads the voltage value which is currently outputted from the tablet key 50 each predetermined interval of time, and continues an operation by holding absolute positional information generated based on the voltage value. The system controller 26 takes in the absolute positional information obtained by the tablet key detecting section 25, for each predetermined interval of time as described later.

In this case, the operational information of the control key 40, the enter key 60, and the power supply key 30 is directly inputted to the system controller 26.

The system controller 26 takes in the operational information (absolute positional information) from the tablet key detecting section 25 and the operational information signals of the control key 40, the enter key 60, and the power supply key 30 by a processing operation described later, and then performs a processing for sending and outputting them as a key operation signal via sending section 27.

The sending section 27 performs a modulation based on a predetermined send format on the key operation signal to be sent and outputted by the control of the system controller 26, and for example, sends and outputs using radio signal. In this case, infrared rays and radio waves are considered as the sending system. However, of course this embodiment is not limited specifically to these types of sending systems.

5. Example of Operation of the Monitor Device According to the Embodiment

Next, operating methods of the control key 4, the tablet key 5, and the enter key 6 provided on the monitor device 1 according to the embodiment, and operations of the monitor device 1 according to operations of these keys will be explained with reference to FIGS. 7A to 7F.

Note that, the operating method of the control key 40, the tablet key 50, and the enter key 60 provided on the remote controller 14, and the operations of the monitor device 1 according to operations of these keys are the same operating methods and operations as the case of operating the control key 4, the tablet key 5, and the enter key 6 of the monitor device 1.

FIGS. 7A to 7F show a display screen which is displayed on the CRT 2 of the monitor device 1. On the display screen of FIG. 7A, the image of the current selected image source is not shown but is actually displayed on the basis of the image signal supplied from the image signal processing block 7.

In such a state, for example, when the user operates the tablet key 5, the sound volume is adjusted. Note that, in the case where it is merely represented that "the tablet key is operated", it should be interpreted that either of the first method and second method, explained above with reference to FIG. 3 may be performed.

Specifically, as the first operating method, the sound volume is turned up when the scroll-up region 5a of the tablet key 5 is simply pressed, and the sound volume is turned down when the scroll-down region 5b is pressed. On the other hand, as the second operating method, the sound volume is turned up in accordance with the movement amount when the tablet key 5 is slide-operated from the bottom in an upward direction, and the sound volume is turned down in accordance with the movement amount when the tablet key 5 is slide-operated from the top in a downward direction.

Figure 7A:
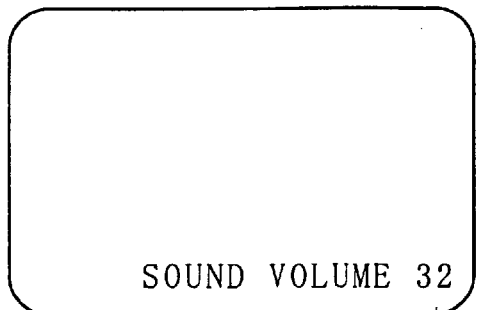
FIGS. 7A to 7F are diagrams explaining a change in a display image corresponding to key operations of the monitor device according to the embodiment.

While the adjustment of the sound volume is performed, a sound volume display 20 indicating the current sound volume is displayed in the display screen as shown in FIG. 7A. Therefore, the user can perform an operation for adjusting the sound volume while viewing the sound volume display 20.

Figure 7B:
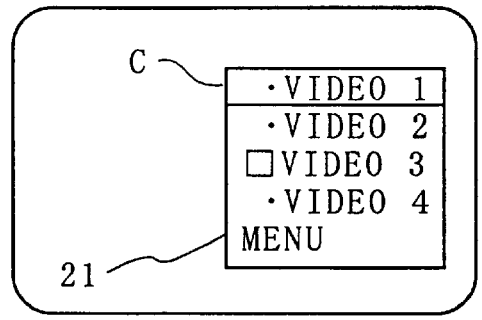

Next, it is supposed that the user operates the control key 4 in a state shown in the aforementioned FIG. 7A. An input switching display 21 is displayed so as to overlap with the image of the image source as shown in FIG. 7B. Note that, the input switching display 21, a main menu 22 and a submenu (sound quality submenu 23) described later are referred to as "menu screen" collectively.

In the input switching display 21 in this case, items of four image sources, "video 1" to "video 4", and an item for moving to the main menu 22 where "menu" is displayed, for a total of five items are displayed. In FIG. 7B, a symbol □ is attached to the item of the video 3, to indicate that the image source which is currently connected to the video 3 is selected. Further, the input switching display 21 displays so that the cursor C is arranged at the item of the "video 1". However, the cursor C can be moved freely in a vertical direction among the aforementioned five items by operation of the tablet key 5.

Figure 7C:
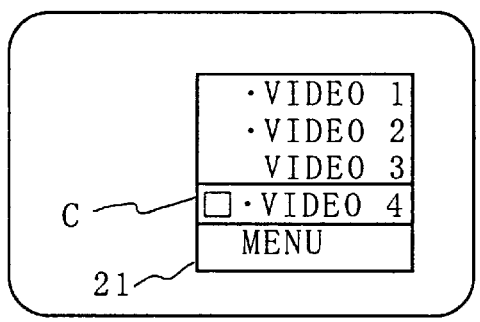

Then, it is supposed that the user operates the tablet key 5 in the state shown in FIG. 7B to move the cursor C to the item of the "video 4", and then operates the enter key 6 in this state. As shown in FIG. 7C, in the input switching display 21, the cursor is arranged at the item of the "video 4" and a symbol □ is attached thereon, to indicate that the image source connected to the "video 4" is selected. Accordingly, the actual display screen is switched from the display of the image source of the "video 3 " to the display of the image source of the "video 4" newly selected.

Note that, in the embodiment, when the enter key 6 is operated to determine some operation, a beep sound for informing the user of this determination can be outputted from the speaker 15. Therefore, when the image source is switched by operating the enter key in this way, the beep sound is also outputted. Further, in the foregoing explanation, each time the enter key 6 is appropriately operated, the beep sound is outputted although the description may be omitted.

Figure 7D:
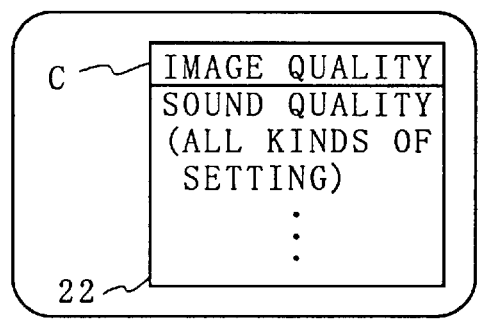

Further, when the cursor C is moved and placed on the item "menu" in the state of the input switching display 21 shown in FIGS. 7B or 7C and the enter key 6 is operated, the display is switched to the display of the main menu 22 shown in FIG. 7D. In the main menu 22, all kinds of adjustment items provided in connection with all kinds of functions including "image quality" and "sound quality" are displayed in a vertical direction and in line. With respect to these plurality of adjustment items, the cursor C can be moved and arranged by operating the tablet key 5 in a manner similar to that described above with respect to the input switching display 21.

Figure 7E:
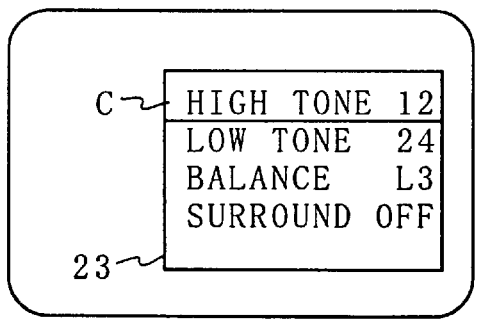

When the cursor C is moved and placed on the item of "sound quality" as shown in FIG. 7D and the enter key 6 is operated, a sound quality submenu 23 is displayed as a submenu as shown in FIG. 7E which is a low-hierarchy of the main menu. A plurality of submenus are provided in accordance with the adjustment items which are picked out as candidates in the main menu 22.

In the sound quality submenu 23 shown in FIG. 7E, items such as "high tone", "low tone", "balance" for adjusting the volume of both sides of stereo sound, and "surround" for setting the turning on/off of a surround effect are displayed as sound quality adjustment items.

When the user attempts to adjust the "low tone" in the display state shown in FIG. 7E, the tablet key 5 is operated to position the cursor C on the item "low tone" and the enter key 6 is operated. Thereby, it is determined that the item "low tone" is adjusted, and as a result, the sound quality submenu 23 is switched to the display shown in FIG. 7F.

Figure 7F:
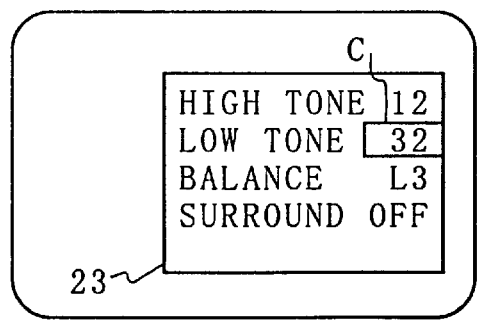

In the sound quality submenu 23 of FIG. 7F, the cursor C is placed only at the part of the adjustment value of the item of "low tone" and the cursor C is fixed at this position, so that the cursor C is not moved by operating the tablet key 5. In this case, the adjustment value of "low tone" increases or decreases by operating the tablet key 5.

Then, when an adjustment value regarded as appropriate by the user is set by operating the tablet key 5, the user operates the enter key 6 to select the adjustment value. After this selection, the system controller 11 controls a sound signal processing block which is not shown so that a low tone based on the adjustment value set by the user is outputted.

Then, to erase the display of the aforementioned menu screen (the input switching display 21, the main menu 22, and all kinds of submenus), the control key 4 may be operated again.

Further, the sound volume display 20 and the display of the menu screen shown in FIGS. 7A to 7E are realized in such a manner that the system controller 11 controls the operation of the tube surface display device 9 on the basis of the key operation to generate an image signal for the sound volume display 20 and the display for all of the kinds of menu screens and then supplies the image signals to the CRT 2 through the image switch 8.

For example, in the case where the operation shown in FIGS. 7A to 7E is performed with a conventional operation system, the system requires at least five keys in total, a sound volume up key, a sound volume down key, at least one input source switching key, a scroll-up key and scroll-down key for the menu for the selection of the set items and to change adjustment values on the menu screen.

On the other hand, in the monitor device according to the present embodiment, in the case where the up/down operations of the sound volume, change to all kinds of adjustment values and selection of items by cursor movement are performed these operations can be performed by only the use of the tablet key 5.

Further, the scroll-up and the scroll-down of the cursor and the change of adjustment values can be performed by performing a slide operation on the tablet key 5 in the vertical direction so the tablet key 5 is treated as a normal scroll-up/scroll-down key. Therefore, the operations of moving the cursor in the vertical direction and of increasing and decreasing the value corresponding to the vertical movement of the user's finger on the tablet, so that the operation efficiency of the user is improved.

Incidentally, in the case where the slide operation is performed by using the tablet key 5 (50) according to the present embodiment, the number of steps to be changed by the slide operation differs depending on the operation object at that time.

Specifically, in the case of the input display switching 21 as shown in FIG. 7B, the cursor C moves among five items in accordance with the slide operation of the tablet key 5, so that the number of steps at this time is "5". Further, in the case where some adjustment values such as the sound volume arid the low tone sound are changed by the slide operation of the tablet key 5 as shown in FIG. 7A or 7F, for example, the number of steps is "100" if the adjustment values can change one by one from "0" to "99".

Therefore, in the embodiment of the invention, it is assumed that the total number of steps (changeable range) in the slidable region set in the tablet key 5 is "M" and the total number of steps (changeable range) of the adjustment value of the operation object is "S", the slide step amount "T" on the tablet key 5 to which the adjustment value one step corresponds is calculated by the following equation (1) whenever the operation object of the tablet key 5 changes.

$$M/S=T \tag{1}$$

Then, the cursor movement or the change of the adjustment values is performed based on the slide step amount "T", thereby the cursor movement amount and the change amount of the adjustment value corresponding to the unit movement amount on the tablet key 5 by the slide operation are appropriately changed.

Therefore, for example, in the case of the input display switching 21 shown in FIG. 7B, when the user performs the slide operation within all of the slidable scope on the tablet key 5, the cursor C is moved among five items which have been just displayed. In the case of the change of adjustment values shown in FIGS. 7A and 7F, for example, when the slidable range on the tablet key 5 is slide operated, the adjustment value changes within the range of "0 to the maximum value". Note that, according to cases, even if the user slide-operates within the all of slidable range, the adjustment value may change within the range of "0 to a certain value"

In this manner, in the embodiment, even when the number of steps changes in accordance with the operation object of the tablet key 5, the whole slide operation region of the tablet key 5 can be effectively used at all times.

6. Processing Operation Based on Key Operations According to the Embodiment (6-a. Sending Processing Operation of Remote Controller)

Figure 8:
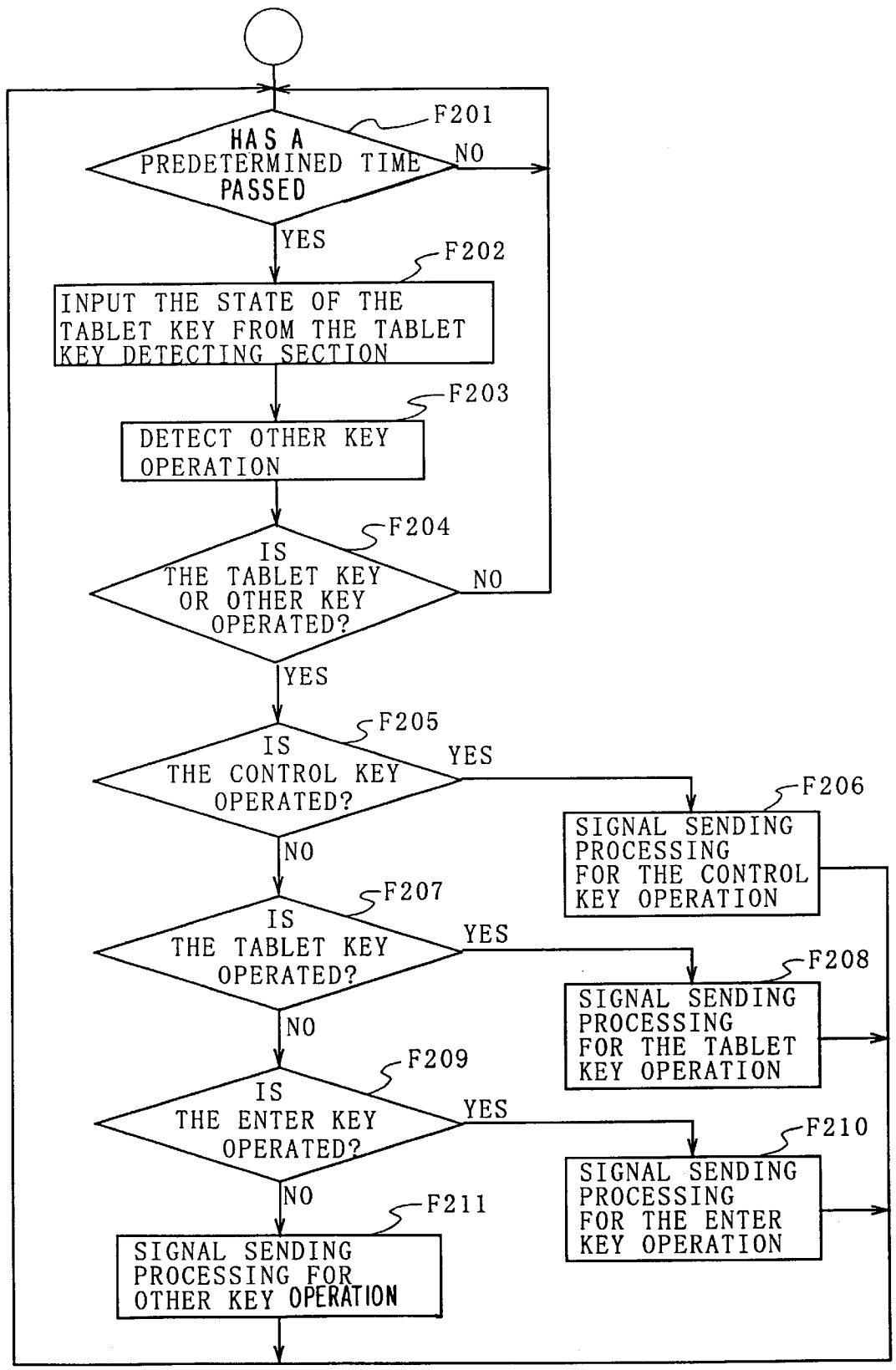
FIG. 8 is a flowchart showing a sending process of the remote controller.

FIG. 8 is a flowchart showing a sending processing operation of the system controller 26 in the remote controller 14.

In the routine, in the beginning, step F201 waits for passage of a predetermined time which was set beforehand. When it is determined that the predetermined time has passed, the process proceeds to step F202, and an operation of taking in absolute positional information of the voltage value of the tablet key 50, which is detected and held by the tablet key detecting section 25, is performed.

Sequentially, at step F203, the state of key operations (including the control key 40 and the enter key 60) other than the tablet key 50 are detected.

Then, at the following step F204, it is judged on the basis of the detection result obtained at the steps F202 and F203 whether the tablet key 5 or some other keys have been operated. Here, specially, as to the tablet key, for example, if the tablet key is not operated, the absolute positional information taken in from the tablet key detecting section 25 is a minimum value corresponding to 0 [V] or a maximum value corresponding to Vcc [V]. Therefore, it is judged that the tablet key 50 is not operated if either value is obtained.

When it is determined at step F204 that no key has been operated, the process returns to step F201 and waits for passage of the predetermined time again.

Then, in the case where it is judged at step F204 that some key has been operated, the process proceeds to step F205 to judge whether or not the key operation judged at step F204 is an operation of the control key 40. When it is judged that the operation is the operation of the control key 4, the process proceeds to step F206 to perform a control processing for sending an operating signal of the control key 40. Then, the process returns to step F201.

When it is judged at step F205 that the operation is not the operation of the control key 40, it is judged at step F207 whether the operation is the operation of the tablet key 50. When it is judged that the operation is the operation of the tablet key 50, a control processing for sending an operating signal of the tablet key 50 is performed at step F208. The process then returns to step F201. Note that, in the present embodiment, as the operating signal of the tablet key 50 which is sent at step S206, at least the absolute positional information taken in from the tablet key detecting section 25 may be sent.

If no at step F207, in step F209, it is judged whether or not the operation is the operation of the enter key 60. When it is judged that the operation is the operation of the enter key 60, a processing for sending an operating signal of the enter key 60 is performed at step F210, and the process returns to step F201.

When it is judged in step F209 that the operation is not the operation of the enter key 60, the process proceeds to step F211 to perform a processing for sending an operating signal of a key other than the control key 40, the tablet key 50, and the enter key 60, which has been operated. If the power supply key 30 is operated, a processing for turning off (or on) the power supply is performed.

(6-b. Display Control Processing Operation of the System Controller of the Monitor Device)

Next, a processing operation of the system controller 11 for realizing a display control operation and a change processing of all kinds of adjustment values in the monitor device 1 in accordance with the key operations shown in FIGS. 7A to 7F will be described with reference to flowcharts of FIGS. 9 to 13.

Figure 9:
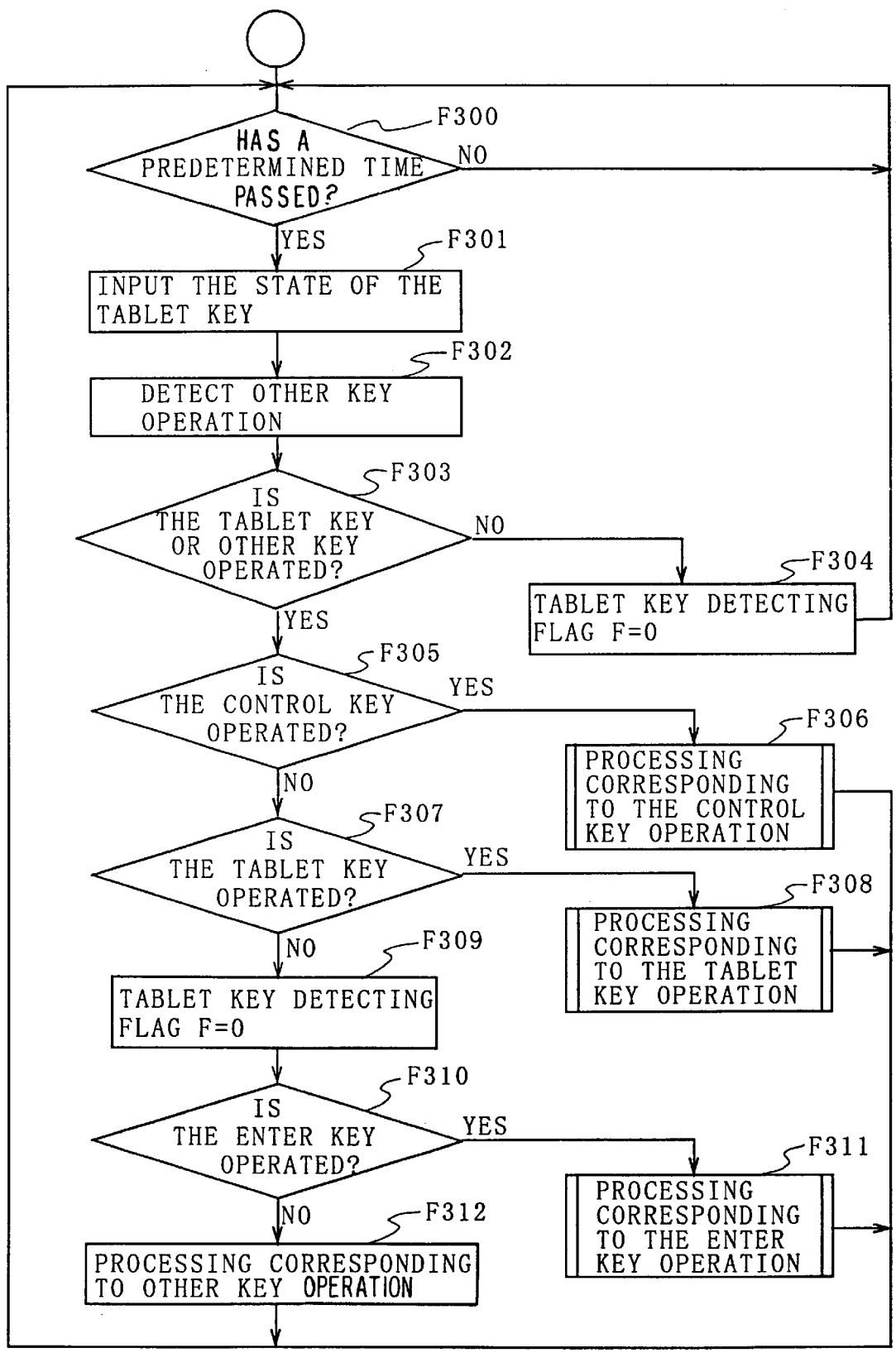
FIG. 9 is a flow chart showing a judgment process for key operation of the monitor device.

FIG. 9 shows a judging processing corresponding to operations performed on a group of keys (including the tablet key 5, the control key 4, and the enter key 6) provided on the monitor device 1 or a group of keys (including the tablet key 50, the control key 40, and the enter key 60) provided on the remote controller 14.

In this routine, in the beginning, step F300 waits for passage of a predetermined time which has set beforehand. When it is detected that the predetermined time has passed, the process proceeds to step F301 to perform a processing for inputting the operation state of the tablet key 5 (50) and understanding the current operation state. At step F301, when the tablet key 5 of the monitor device 1 is operated, the absolute positional information held in the tablet key detecting section 10 is taken in. Further, when the tablet key 50 of the remote controller 14 is operated, an operating signal of the tablet key 50 sent from the remote controller 14 is received by the receiving section 12, so that the system controller 11 takes in the absolute positional information as an operating signal of the tablet key 50 transmitted from the receiving section 12.

Sequentially, at step F302, the state of key operations (including the control key 4 (40) and the enter key 6 (60)) other than the tablet key 5 (50) is detected. At step F302, when keys of the monitor device 1 are operated, operation information signals which are output from these keys are taken in. When keys of the remote controller 14 are operated, an operating signal of each key received be the receiving section 12 is taken in.

At step F303, it is judged based on the detection result obtained at steps F301 and F302 whether the tablet key or other keys have been operated, and when it is judged that no key has been operated, the process proceeds to step F304. Then, a tablet key detecting flag F indicating that the tablet key is operated is set to zero. That is, the tablet key detecting flag F is cleared, and the process returns to step F300 to wait for the passage of the predetermined time again.

Note that, the tablet key detecting flag F is set to zero or one. When the tablet key detecting flag F is set to zero, it is indicated that the tablet key 5 (50) is not pressed. On the other hand, when the tablet key detecting flag F is set to one, it is indicated that the tablet key 5 (50) is pressed.

When it is judged at step F303 that some key has been operated, the process proceeds to step F305 to judge whether the operation of the key judged at step F303 is the operation of the control key 4 (40). When it is judged that the operation is the operation of the control key 4 (40), the process turns to a routine of a processing operation corresponding to the operation of the control key 4 (40) of step F306.

When it is judged at step F305 that the operation is not the operation of the control key 4 (40), it is judged at step F307 whether the operation is the operation of the tablet key 5 (50). When it is judged that the operation is the operation of the tablet key 5 (50), the process turns to a routine of a processing operation corresponding to the operation of the tablet key 5 (50) of step F308. When it is judged that the operation is not the operation of the tablet key 5 (50), the process proceeds to step F309 and the tablet key detecting flag F is set to zero, and then the process proceeds to step F310.

At step F310, it is judged whether the operation is the operation of the enter key 6 (60), and when it is judged that the operation is the operation of the enter key 6 (60), the process turns to a routine for a processing corresponding to the operation of the enter key 6 (60) of step F311. When it is judged that the operation is not the operation of the enter key 6 (60), the process proceeds to step F312 to perform a processing corresponding to the operated key considering that some key other than the control key 4 (40), the tablet key 5 (50), and the enter key 6 (60) has been operated. For example, if the power supply key 3 (30) is operated, a processing for turning off (or on) the power supply is performed. Note that, after the processing of steps F304, F306, F308, F311, and F312 are finished, the process returns to step F300.

Figure 10:
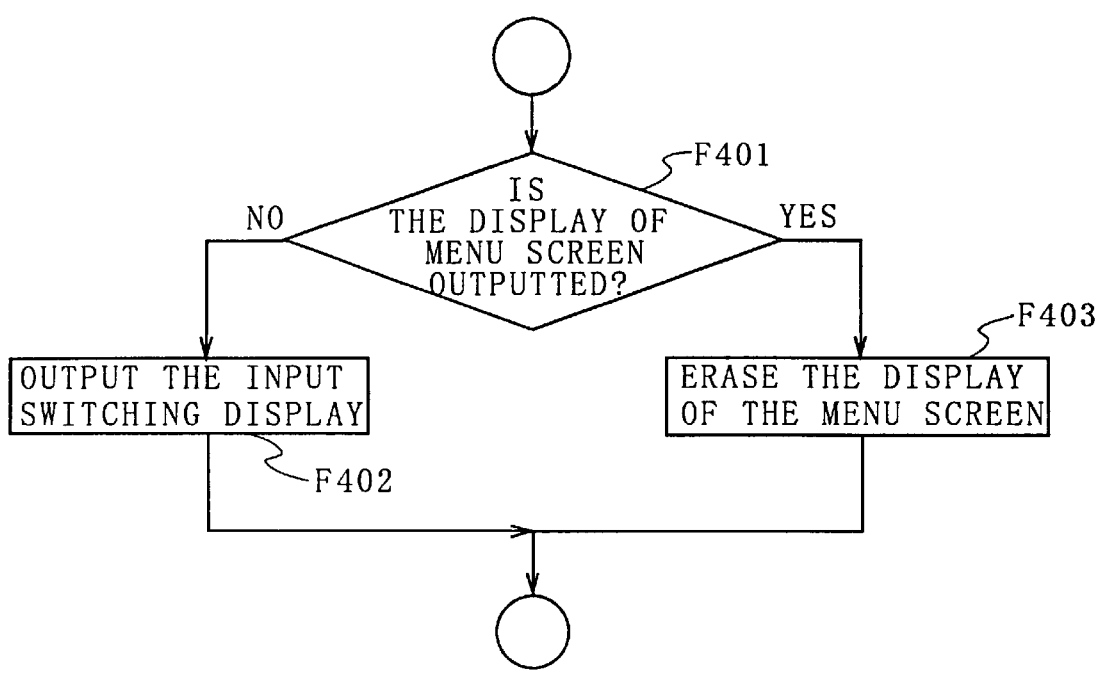
FIG. 10 is a flowchart showing a processing operation corresponding to operations of a control key.

FIG. 10 shows a processing corresponding to the operation of the control key 4 (40) as a processing routine of step F306 shown in FIG. 9.

At step F401, it is judged whether some menu screen (referring to FIGS. 7A to 7F) is being displayed as the current display state. When it is judged that a screen is not being displayed, a processing for displaying the input switching display 21 as the menu screen is performed at step F402. When it is judged at step F401 that some menu screen is being displayed, the menu screen which is being displayed is erased by the processing of step F403.

Figure 11:
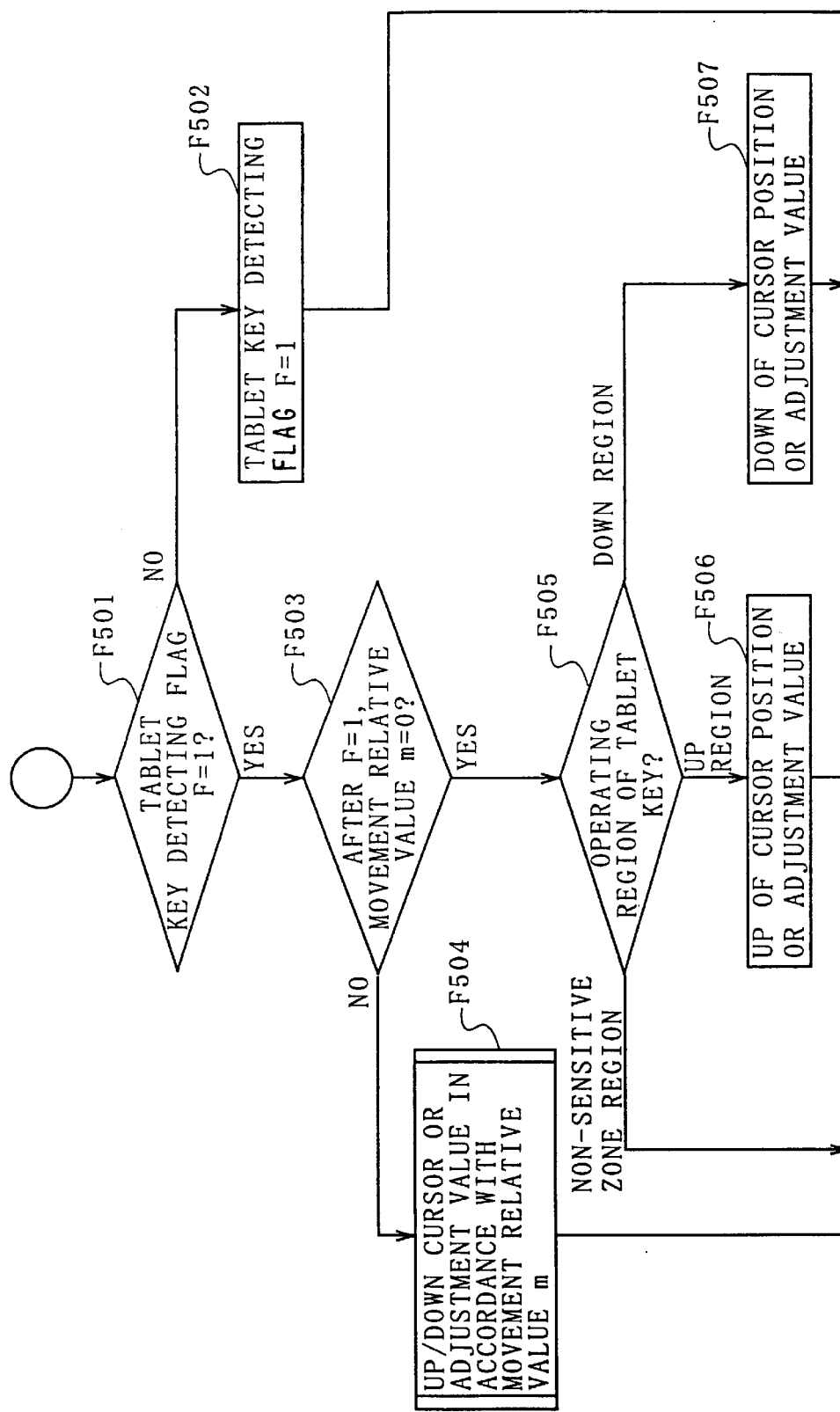
FIG. 11 is a flowchart showing a processing operation corresponding to operations of the tablet key.

FIG. 11 shows a processing corresponding to the operation of the tablet key 5 (50) as a processing routine of step F308 shown in FIG. 9.

In this routine, at step F501, it is judged whether the tablet key detecting flag F is currently one. Here, when the tablet key detecting flag F is zero, that is, when an affirmative judgment result at step F307 shown in FIG. 9 corresponds to the operation starting time of the tablet key 5 (50), the process proceeds to step F502 to set the tablet key detecting flag F to one, and then the process returns to the previous routine.

When the tablet key detecting flag F has been set to one, the process proceeds to step F503 to judge whether a movement relative value m which indicates relative slide movement amount on the tablet from the time when tablet key detecting flag F was last set to one last to the present is zero. That is, it is determined whether the current operation of the tablet key 5 is the slide operation or merely the pressing operation.

For example, the movement relative value "m" can be obtained based on the absolute positional information taken in from the tablet key detecting section 10 (or received by the receiving section 12). That is, the information of the movement relative value "m" can be obtained by calculating the difference between the absolute positional information taken in corresponding to the time when the tablet key detecting flag "F" was set to one after starting the pressing operation of the tablet key 5 (50) and the updated absolute positional information. That is, it is assumed that the absolute positional information taken in corresponding to the time when the tablet key detecting flag "F" was set to one is "a" and the updated absolute positional information is "b", the movement relative value "m" can be obtained by the following equation (2).

$$m=a-b \tag{2}$$

At step F503, when it is judged that the movement relative value "m" is not zero, that is, when the slide operation is performed, the process proceeds to step F504. Here, on the basis of the current movement relative value "m", as the current operation object of the tablet key 5 (50), the cursor movement is controlled when the cursor C can move, and the up/down of the adjustment value is controlled when the adjustment value can change.

Note that, at step F504, when the cursor movement is controlled and the change of the adjustment is controlled, the slide stop amount "T" on the tablet key 5 corresponding to the adjustment value one step of the operation object is obtained. For example, this can be obtained by using the equation (1) as the number of steps of the adjustment value changes for each operation object as described above. The processing is then performed based on the slide step amount "T" so that the cursor movement amount corresponding to the unit movement amount on the tablet key 5 (50) and the change amount of the adjustment value properly changes. An example of this processing operation will be described later.

At step F503, when it is judged that the movement relative value "m" is zero and the mere pressing operation is operated, the process proceeds to step F505 to judge which region (referring to FIG. 3) the operating position of the current tablet key 5 (50) exists on. The operating position of the tablet key 5 (50) essentially corresponds to the pressed operation position shown in FIG. 2. Therefore, the judgment of the operating position can be performed based on the updated absolute positional information.

At step F505, when it is judged that the current operation region is the scroll-up region 5a, the process proceeds to step F506, and the processing for moving the cursor C in an upward direction or a processing for increasing the adjustment value is performed in accordance with the current operation object.

Further, when it is judged that the current operation region is the scroll-down region 5b, the process proceeds to seep F507, and a processing for moving the cursor C in a downward direction or a processing for decreasing the adjustment value is performed in accordance with the current operation object.

Furthermore, when it is judged that the current operation region is the non-sensitive zone region 5c, a special processing is not performed and the process returns to the previous routine. Therefore, the pressing operation on the non-sensitive zone region 5c is invalid.

Figure 12:
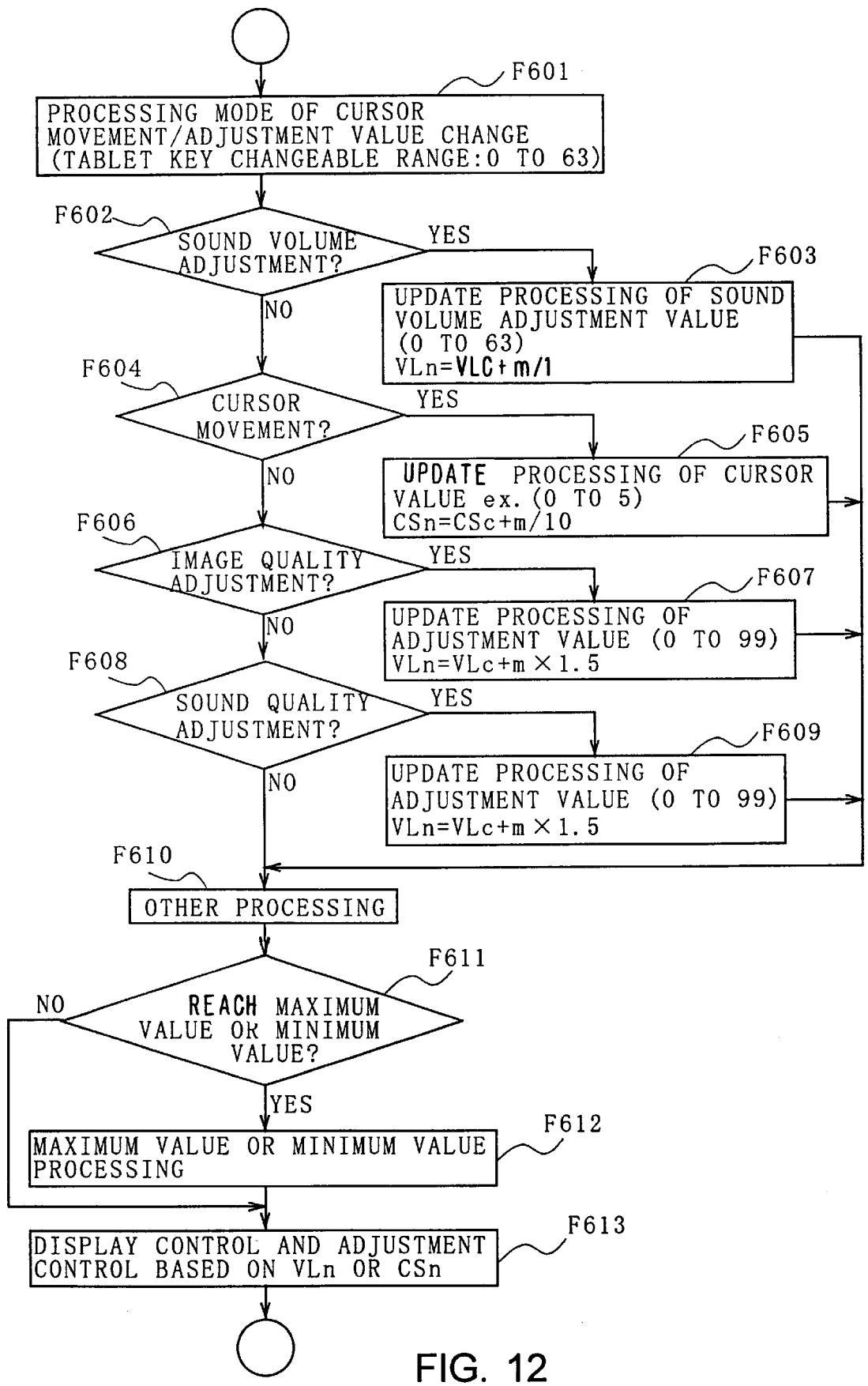
FIG. 12 is a flowchart showing an updating process of an adjustment value based on the amount of the changed slide movement and a movement value of a cursor as a processing operation corresponding to operations of the tablet key.

A flowchart of FIG. 12 shows a processing operation for performing the cursor movement control or the change control of the adjustment value by changing the cursor movement amount or the change amount of the adjustment value corresponding to the unit movement amount on the tablet key 5 (50) in accordance with the changeable range of the control parameter of the operation object, as a processing routine of step F504 shown in FIG. 11.

Here, in the beginning, the process proceeds to step F601 to become a cursor movement/adjustment value change processing mode. Note that, for the sake of convenience of the explanation, assuming that the changeable range of the voltage value (absolute positional information) of the tablet key 5 (50) which is being pressed is sixty four steps of zero to sixty three, the explanation will be described.

Following step F601, a judgment will be performed to determine what the current operation object is. Here, the process proceeds to step F602 to perform the judgment whether the current operation object is the sound volume adjustment. When it is judged at step F602 that the current operation object is not the sound volume adjustment, the process proceeds to step F604. When it is judged that the current operation object is the sound volume adjustment, the process proceeds to step F603.

At step F603, processing is performed for updating the adjustment value of the sound volume in accordance with the slide operation. Note that, the changeable range of the adjustment value is sixty four steps of zero to sixty three.

At step F603, in order to update the adjustment value, in the beginning, the slide step amount "T" of the tablet key 5 (50) for the adjustment value of one step is obtained. The amount "T" can be obtained based on the aforementioned equation (1).

In this case, the changeable range of the absolute positional information of the tablet key 5 (50) is sixty four and the changeable range of the sound adjustment value is also sixty four, so that M=S=64. Thereby the slide step amount "T" is calculated by the following equation (3).

$$T=M/S=64/64=1 \tag{3}$$

Sequentially, a new adjustment value will be obtained by using the slide step amount T=1 calculated described above. It is assumed that the new adjustment value is "VLn" and the current adjustment value is "VLc", the new adjustment value is calculated as by the following equation (4).

$$VLn=VLc+(m/T)=VLc+(m/a) \tag{4}$$

Note that, the "m" in the equation (4) is the movement absolute value.

At step F603, the adjustment value of the sound volume is renewed to the new adjustment value calculated by the equation (4), and the processing is completed.

In this way, as to the updating processing of the adjustment value according to the embodiment, in the beginning, the step change amount (slide step amount "T") of the tablet key 5 (50) for the present adjustment value one step is obtained, and then the new adjustment value is obtained by using the slide step amount "T", the current movement relative value of "m", and the current adjustment value "vLc".

At step F604, it is judged whether the operation object is the cursor movement. When it is judged that the operation object is not the cursor movement, the process proceeds to step F606. When it is judged that the operation object is the cursor movement, the process proceeds to step F605.

At step F605, a processing is performed for renewing the cursor value in accordance with the slide operation. The "cursor operation" is a value which is assigned to every cursor moveable region. Specifically, in the input switching display 21 shown in FIG. 7B, five cursor moveable regions (regions of "video 1" to "menu") exist and, in this case, the regions of "video 1" to "menu" are respectively assigned the cursor values of "0" to "4".

Here, at step F605, it is assumed that the number of current cursor moveable regions is six and the changeable range of the cursor value is "0" to "5" (six steps).

In this case, the total number "M" of steps of the absolute positional information of the tablet key 5 (50) is sixty four and the total number "S" of steps of the cursor value is six. Therefore, the slide step amount "T" is calculated by the following equation (5).

$$T=M/S=64/6=10 \ldots 4 \quad (5)$$

However, in present the embodiment, fractions (rest) occur in the calculation result as shown in the equation (5), the fractions (rest four) is omitted. Therefore, in this case, the slide step amount "T" becomes ten.

Next, provided that the slide step amount "T" as the calculation result of the equation (5) is ten, the new cursor value "CSn" is obtained by the following equation (6).

$$CSn=CSc+(m/T)=CSc+(m/10) \quad (6)$$

Note that, the "CSc" in the equation (4) is the current cursor value. At step F605, updating is performed so that the cursor value is the new cursor value "CSn", and then the processing is completed.

At step F606, it is judged whether the operation object is an adjustment item out of all kinds of image quality adjustment items which have been prepared beforehand. When it is judged that the operation object is not the image quality adjustment item, the process proceeds to step F608. When it is judged that the operation object is the image quality adjustment, the process proceeds to step F607.

At step F607, processing is performed for updating the adjustment value on the image quality adjustment item which is currently selected. Here, the changeable range of the adjustment value is one hundred steps of zero to ninety nine in the image quality adjustment item.

In this case, the changeable range "i" of the absolute positional information of the tablet key 5 (50) is sixty four and the changeable range of the adjustment value is one hundred. Therefore, the slide step amount "T" is calculated by the following equation (7).

$$T=M/S=64/100=0.64 \quad (7)$$

In this case, when the new adjustment value "VLn" is calculated, the movement relative value "m" is multiplied by one point five which is the approximation of the following equation (8).

$$1/T=1/0.64 \quad (8)$$

That is, the new adjustment value "VLn" is calculated by the following equation (9).

$$VLn=VLc+1.5m \quad (9)$$

The adjustment value is updated so as to become the new adjustment vale "VLn", and then the processing of step F607 is completed.

At step F608, it is judged whether the operation object is an adjustment item out of all kinds of sound quality adjustment items prepared beforehand. When it is judged that the operation object is not the sound quality adjustment item, the process proceeds to step F610. When it is judged that the operation object is the sound quality adjustment item, the process proceeds to step F609.

At step F609, processing is performed for calculating the new adjustment value on the sound quality adjustment item which is currently selected. Here, the changeable range of the sound quality adjustment item is one hundred steps of zero to ninety nine.

In this case, similarly to the image quality adjustment of the aforementioned step F607, the changeable range of the absolute positional information of the tablet key 5 (50) is sixty four steps and the changeable range of the adjustment value is one hundred steps.

In this case, the slide step amount "T" is obtained by the calculation of the equation (7), and the new adjustment value "VLn" is calculated by the equation (9). The adjustment value is then updated so as to become the new adjustment value "VLn" and the processing of step F609 is completed.

At step F610, after performing calculation processing of the new adjustment value on operation objects other than the sound volume adjustment, the cursor movement, the image quality adjustment item, and the sound quality adjustment item, the process proceeds to step F611. Note that, in the monitor device 1 according to the present embodiment, in the case where operation object items which can be operated by the tablet key 5 (50) do not include other than the sound volume adjustment, the cursor movement, the image quality adjustment, and the sound quality adjustment, the processing of step F610 can be omitted.

At step F611, it is judged whether the adjustment value (here, the new adjustment value "VLn" or the new cursor movement value "CSn")which has been updated by performing any processing of steps F603, F605, F607, F609 and F610 becomes the maximum value or more or the minimum value or less. When a negative result is obtained, the process proceeds to step F613 regarding the updated adjustment value as being within the range of the minimum value to the maximum value. When an affirmative result is obtained, the process proceeds to step F612.

At step F612, in the case where the updated adjustment value is the maximum value or more, a processing for making the updated adjustment value the maximum value of the adjustment value which has been set to the current operation object is performed. In the case where the updated adjustment value is the minimum value or less, a processing for making the updated adjustment value the minimum value of the adjustment value which has been set to the current operation object is performed, and then the process proceeds to step F613.

At step F613, on the basis of the adjustment value updated by the aforementioned processing operation or the cursor value, the display control on the current selected operation object and the adjustment control for the required adjustment item based on the updated adjustment value are performed.

Specifically, for example, in the case where the new sound volume adjustment value "VLn" is set by passing through step F603 to reach step F613, the sound volume adjustment control is performed so that the sound volume actually changes in accordance with the new sound volume adjustment value "VLn". Further, in parallel to this, for example, the display control is performed so that the sound volume adjustment value on the sound volume display 20 shown in FIG. 7A corresponds to the new sound volume adjustment value "VLn".

Further, for example, in the case where the new cursor value "CSn" set by passing through step FG05 to reach step F613, the display control is performed so that the cursor movement is performed based on the new cursor value "CSn".

Further, in the case where the new adjustment value "VLn" for the image quality adjustment is set by passing through step F607 to reach step F613, the image quality adjustment of the current selected image quality item is performed based on the new adjustment value "VLn", and the control for changing and displaying the image quality adjustment value which is being outputted at this time is performed.

Further, in the case where the new adjustment value "VLn" for sound quality adjustment is set by passing through step F609 to reach step F613, the sound quality adjustment of the current selected sound volume adjustment item is performed based on the new adjustment value "VLn", and the control for changing and displaying the sound quality adjustment value which is being outputted at this time is performed. For example, in the display state shown in FIG. 7B, the adjustment value in the sound quality adjustment item of "high tone" in the sound quality submenu 23 is changed and displayed based on the tablet key 5 (50), and the sound quality of the output sound is changed based on the changed adjustment value so that the high tone is emphasized or reduced.

Note that, the movement step amount "T" can use the approximation at steps F605, F607, and F609 by omitting the fractions, because the sliding operation on the tablet key is a rough operation.

Figure 13:
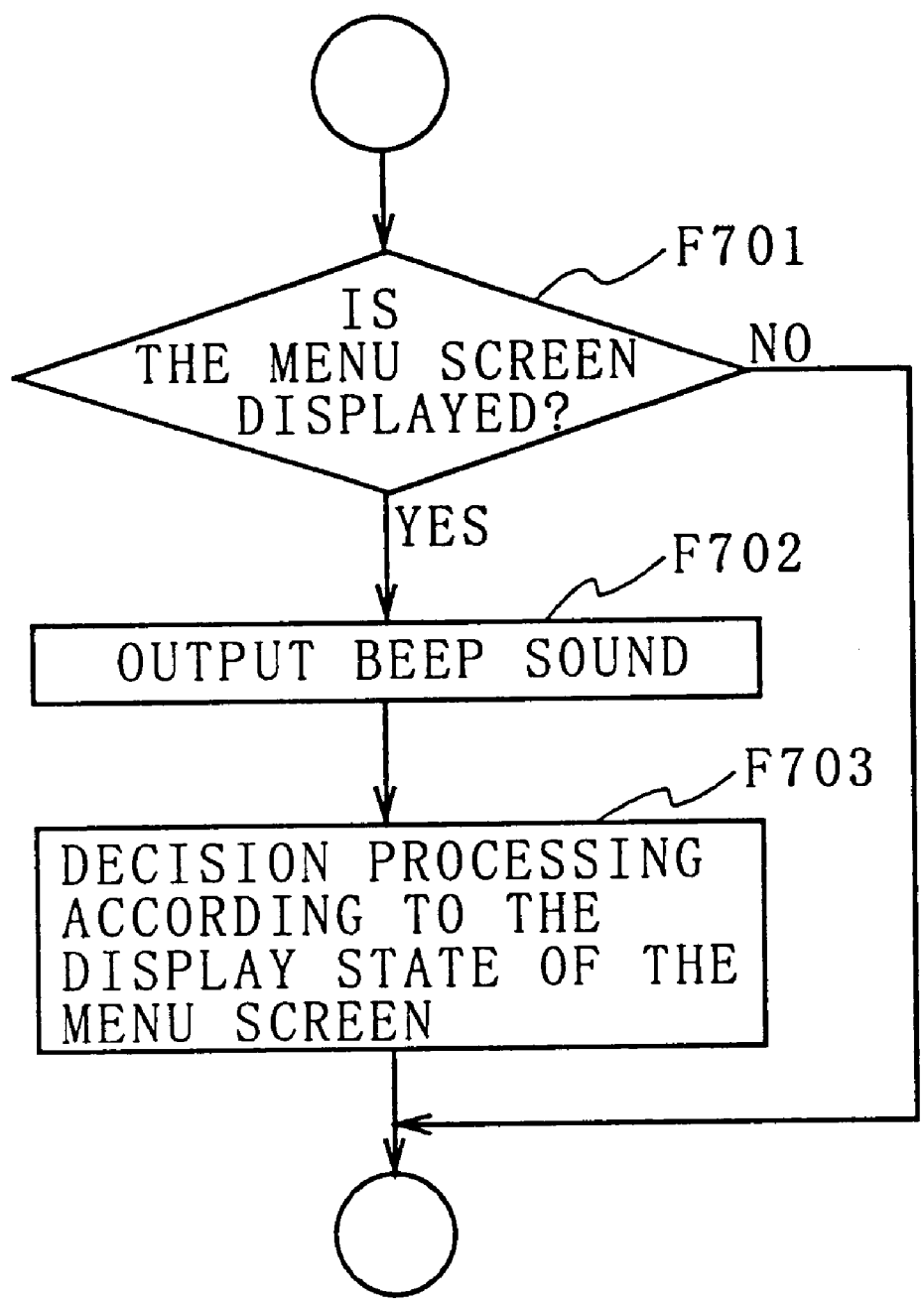
FIG. 13 is a flowchart showing a processing operation corresponding to operations of an enter key.

FIG. 13 shows a processing corresponding to the operation of the enter key 6 (60) as the processing routine of step F311 shown in FIG. 9. Here, in the beginning, at step F701, it is judged whether some menu display (including the input switching display 21 shown in FIGS. 7B and 7C) is being displayed currently. When the menu screen is not displayed, the process returns to the previous routine and the operation of the enter key 6 (60) is invalid. When the menu screen is being displayed currently, the process proceeds to step F702 to output the beep sound for indicating that a predetermined decision processing corresponding to the contents of the current menu is performed, by operation of the enter key 6 (60). At step F703, a decision processing corresponding to the display state of the menu screen is then performed, and then the processing then returns to the previous routine.

As a concrete example of the decision processing, for example, in the case where the enter key 6 (60) is operated with a state where the cursor C is arranged on the "menu" region in the input switching display 21 shown in FIG. 7C, as the decision processing, the display control is performed to switch the display of the main menu 22 from FIG. 7C to FIG. 7D, and at this time, the beep sound indicating the execution of the decision processing is output from the speaker.

Note that, the present invention is not limited to the aforementioned embodiment, and change can be performed, for example, so that the display state such as the sound volume display and the menu screen display as shown in FIGS. 7A to 7F can be changed so that it is easy for the user to understand the change visually.

Further, for example, the output of the beep sound at the time of operation of the enter key 6 (60) is provided as a set item of the menu screen, that the user arbitrary can turn on/off.

Furthermore, the monitor device of the present invention can be applied to a television receiving device which provides a tuner for receiving television broadcasting.

As described above, in the present invention, a tablet key is provided which can perform cursor movement and which can change of the adjustment values. Accordingly almost all of setting, and adjustments on all kinds of functions of the monitor device can be performed simply by a pressing operation and a slide operation with an extremely small number of keys in comparison with the number of keys necessary for the conventional operating system.

Further, the present invention is constituted so that the cursor moves in the vertical direction and the adjustment value increases and decreases by slide-operating the tablet key in the vertical direction, in order to fit the operation sense of the user. Therefore, the improvement of usage is not prevented even with an operation system with a small number of keys.

While there has been described herein preferred embodiments of the present invention, it will be apparent to those skilled in the art that various changes and modifications may be made thereto and that the appended claims cover all such changes and modifications as fall within the true spirit and scope of the invention.

What is claimed is:

1. A display control device incorporated into a monitor for controlling adjustment of a value of each set item displayed on the monitor and selection of a set item, said device comprising:

a tablet key having a pressing region for outputting positional information corresponding to a pressed position on said pressing region, said pressed position being a result of one of a sliding operation and a pressing operation by a finger of a user;

detecting means for detecting, based on said positional information, whether the pressed position pressed on said pressing means has moved and, when it is detected that said pressed position has moved, generating movement information indicating an amount of change of said positional information, and for detecting whether the amount of change of said positional information is the result of one of said sliding operation and said pressing operation;

control means for controlling the adjustment of the value of said each set item and the selection of said set item from a menu screen of a plurality of set items, on the basis of said movement information when said detecting means detects that said pressed position has moved, or on the basis of said positional information when said detecting means detects that said pressed position has not moved;

a control key for outputting display on/off switching information for the menu screen of the plurality of set items on the basis of an input operation by a user, wherein said control means controls switching on/off the menu screen on the basis of said display on/off switching information; and an enter key for outputting decision information on the basis of an input operation by a user, wherein said control means controls a decision processing on a current selected set item on the basis of said decision information.

2. The display control device according to claim 1, wherein said detecting means generates said movement information on the basis of a difference between positional information indicating a position where one of sliding and pressing of said pressing means is started and positional information indicating a current pressed position.

3. The display control device according to claim 2, wherein:

said detecting means, when it is detected that said pressed position does not move, divides the pressing region of said pressing means into plural sub-regions and generates sub-region information indicating on which sub-region the pressed position indicated by said positional information exists; and said control means controls the adjustment of the value of said each set item and the selection of said set item on the basis of said sub-region information.

4. The display control device according to claim 3, wherein said detecting means divides said pressing region into a first sub-region, a second sub-region, and a third sub-region which exists between said first sub-region and said second sub-region; and said control means controls the adjustment of the value of said each set item and the selection of said set item with said third sub-region as a non-sensitive region.

5. The display control device according to claim 1, wherein said control means changes a transition state of switching an adjustment amount of the value of said each set item and the selection of said set item for said movement information on the basis of the selected set item.

6. The display control device according to claim 1, wherein said display control device comprises a monitor device having said monitor and a remote control device for controlling said monitor device, and said pressing means is provided in said remote control device.

7. The display control device according to claim 6, wherein said detecting means and said control means are provided in said monitor device.

8. A method of controlling adjustment of a value of each set item displayed on a monitor, comprising the steps of:

outputting positional information corresponding to a pressed position on a pressing region of a tablet key located on the monitor, said pressed position being a result of one of a sliding operation and a pressing operation by a finger of a user;

detecting, based on the positional information from said step of outputting, whether the pressed position pressed on said pressing region has moved and, when it is detected that said pressed position has moved, generating movement information indicating an amount of change of said positional information, and detecting whether said amount of change of said positional information is the result of one of said sliding operation and said pressing operation;

controlling the adjustment of the value of said each set item and the selection of said set item from a menu screen of a plurality of set items, on the basis of said movement information when said detecting means detects that said pressed position has moved or on the basis of said positional information when said detecting means detects that said pressed position has not moved;

outputting display on/off switching information for the menu screen of the plurality of set items on the basis of an input operation by a user and controlling switching on/off the menu screen on the basis of said display on/off switching information; and outputting decision information on the basis of an input operation by a user and controlling a decision processing on a current selected set item on the basis of said decision information.

* * * * *